(12) United States Patent
Satterfield et al.

(10) Patent No.: US 8,578,023 B2
(45) Date of Patent: Nov. 5, 2013

(54) COMPUTER RESOURCE UTILIZATION MODELING FOR MULTIPLE WORKLOADS

(75) Inventors: Wade J Satterfield, Fort Collins, CO (US); Michael R Stabnow, Fort Collins, CO (US); Todd M Spencer, Fort Collins, CO (US); Jon Duane Warden, Fort Collins, CO (US); Zengfa Gao, Fort Collins, CO (US); James Eugene Wade, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 153 days.

(21) Appl. No.: 13/194,505

(22) Filed: Jul. 29, 2011

(65) Prior Publication Data
US 2013/0030785 A1    Jan. 31, 2013

(51) Int. Cl.
*G06F 17/50*    (2006.01)

(52) U.S. Cl.
USPC ............... 709/224; 703/2; 709/226; 706/48; 714/47.1

(58) Field of Classification Search
None
See application file for complete search history.

(56) References Cited

U.S. PATENT DOCUMENTS

| | | | |
|---|---|---|---|
| 6,836,800 B1* | 12/2004 | Sweet et al. | 709/224 |
| 7,401,012 B1* | 7/2008 | Bonebakker et al. | 703/2 |
| 2008/0221941 A1 | 9/2008 | Cherkasova et al. | |
| 2010/0185768 A1 | 7/2010 | Hamedany et al. | |
| 2010/0287019 A1* | 11/2010 | Guo et al. | 705/8 |
| 2011/0078106 A1* | 3/2011 | Luchi et al. | 706/48 |
| 2011/0093253 A1 | 4/2011 | Kraft et al. | |

OTHER PUBLICATIONS

Carrasquilla,U.;Capacity Planning by Simulating Unix Servers;32nd Council on Compensation Insurance, Inc.; Dec. 2006;http://www.cala.net/publications/cmg06_JUNE 2006.pdf.

Li, Ta-Hsin;A Statistical Framework of Optimal Workload Consolidation with Application to Capacity Planning for On-demand Computing; http://pubs.amstat.org/doi/abs/10.1198/016214506000000744?journalCode=jasa > On pp. 841-855; vol. 102; Issue: 479; Sep. 1, 2007.

* cited by examiner

*Primary Examiner* — Jung Kim
*Assistant Examiner* — Janusz Kusyk (57) ABSTRACT

Computer resource utilization modeling for multiple workloads includes a computer obtaining resource utilization data, the resource utilization data having groups of computer resource utilization measurements made during time intervals for a plurality of workloads. The computer determines parameters representing a distribution of the computer resource utilization measurements for each of the groups to generate a baseline of distributions across the time intervals for each of the plurality of workloads. The computer sums the baselines of distributions for the plurality of workloads to generate a combined baseline of distributions across the time intervals for a combination of the plurality of workloads.

20 Claims, 5 Drawing Sheets

COMPUTER RESOURCE UTILIZATION MODELING FOR MULTIPLE WORKLOADS

BACKGROUND

Capacity planning for computer systems involves determining the amount of resources needed to host a proposed amount of work. The proposed amount of work can include a workload, which is a particular unit of work for which utilization of computer resources can be quantified. For example, a workload can be a process or set of processes executing in an operating system (OS) (e.g., a database application). In another example, a workload can be a complete operating environment that includes an OS and applications, such as a virtual machine. Computer resources can include central processing unit (CPU), memory, network, storage, and like type resources included in a computer or multiple computers. Capacity planning software models computer resource utilization for the proposed amount of work. The model attempts to predict if a proposed amount of work can execute given a proposed amount of computer resources without encountering any bottlenecks. A bottleneck can occur if the demand for any computer resource, such as a CPU, exceeds the capacity of the proposed computer resources.

BRIEF DESCRIPTION OF THE DRAWINGS

Some embodiments of the invention are described with respect to the following figures.

DETAILED DESCRIPTION

Computer resource utilization modeling for multiple workloads is described. In an embodiment, a computer models computer resource utilization by first obtaining resource utilization data. The resource utilization data includes groups of computer resource measurements made during time intervals for a plurality of workloads. The computer determines parameters representing a distribution of the computer resource utilization measurements for each of the groups to generate a baseline of distributions across the time intervals for each of the plurality of workloads. The computer sums the baselines of distributions for the plurality of workloads to generate a combined baseline of distributions across the time intervals for a combination of the plurality of workloads. The computer can then generate metric(s) from the combined baseline of distributions, such as an estimate of peak resource utilization by the workloads as a combination, an estimate of resource utilization expected to be exceeded by a defined percentage of time (e.g., what is the level of resource utilization the workloads will exceed 1% of the time), the average utilization, and the like. These metrics can be used by the capacity planner to determine if the combined workload will fit on a given system.

For a single workload, peak and average resource utilization may be used for capacity planning. When combining workloads, individual peak and average resource utilizations for each of the workloads is not enough information to provide proper capacity planning for the combination of workloads. The sum of peak resource utilizations is not useful, as workloads rarely peak in their demand for resources at the same time. A weighted average of peak resource utilizations can be calculated to estimate the peak resource utilization of the combined workloads, but such an estimate can be inaccurate. Inaccurate capacity planning can lead to under-provisioning of computer resources for the workloads, causing bottlenecks. Inaccurate capacity planning can also lead to over-provisioning of resources, which results in higher data center costs. By using distributions to model computer resource utilization, capacity planning software can predict the likelihood that peaks in workload resource utilizations will align, avoiding under-provisioning of computer resources and predicting bottleneck situations.

In addition, the resource utilization data for all of the workloads can include a large number of measurements. Attempting to capacity plan using the resource utilization data would be computationally intensive and impractical. In examples described herein, the resource utilization data is represented by a smaller set of distribution parameters. The smaller set of distribution parameters can provide an accurate estimate of the resource utilization data, and can be processed using less computationally intensive processes than would be required to process the raw measurements themselves. Thus, less computer resources are needed to perform capacity planning using the distributions described herein. Various embodiments are described below by referring to several examples.

Figure 1:
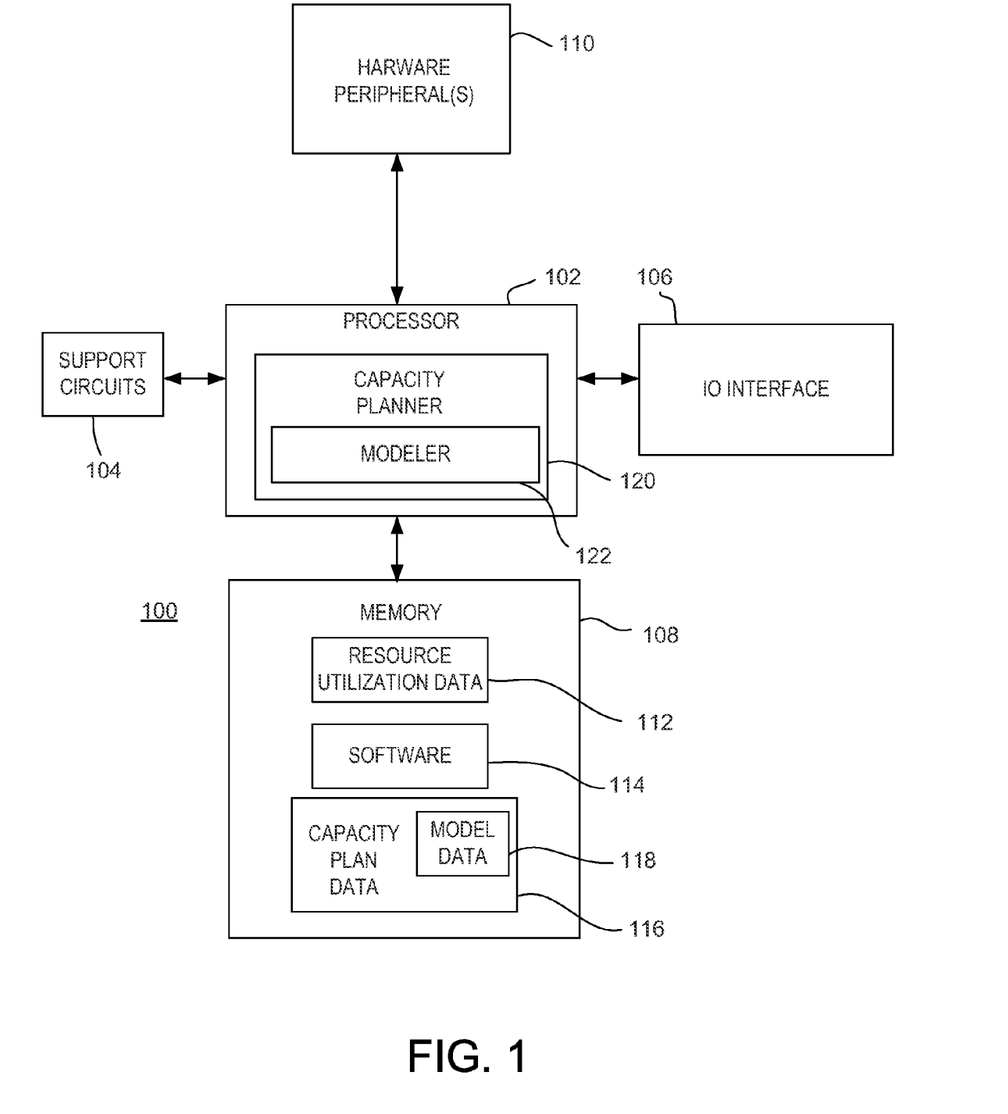
FIG. 1 is a block diagram depicting a computer according to an example implementation.

FIG. 1 is a block diagram depicting a computer 100 according to an example implementation. The computer 100 includes a processor 102, support circuits 104, an input/output (IO) interface 106, and a memory 108. The computer 100 can also include hardware peripheral(s) 110. The processor 102 includes any type of microprocessor, microcontroller, microcomputer, or like type computing device known in the art. The processor 102 can include at least one such computing device, each of which having at least one computing unit or "core". The support circuits 104 for the processor 102 can include cache, power supplies, clock circuits, data registers, IO circuits, and the like. The IO interface 106 can be directly coupled to the memory 108, or coupled to the memory 108 through the processor 102. The memory 108 can include random access memory, read only memory, cache memory, magnetic read/write memory, or the like or any combination of such memory devices. The hardware peripheral(s) 110 can include various hardware circuits that perform functions on behalf of the processor 102.

The computer 100 obtains resource utilization data 112, which is stored in the memory 108. The resource utilization data 112 includes measurements of computer resource utilization for a plurality of workloads. As noted above, a "workload" can be a defined unit of work for which utilization of computer resources can be quantified. A "computer resource utilization" (or "resource utilization") is a metric describing use of a computer resource (or "resource"). For example, computer resources can include CPUs, memory, network, disk space, etc. A metric for CPU utilization can be a percentage of processing power, a number of cores being utilized, etc. A metric for memory utilization can be a percentage of used memory, an amount of used/free space, a percentage or amount of access, etc. A metric for network utilization can be a percentage of available bandwidth being used, an amount of bandwidth (e.g., a bit rate), etc. A metric for disk space can include a percentage of used/free space, an amount of used/free space, a percentage or amount of access, etc.

A "measurement" is a value for computer resource utilization made at a particular time or over a particular time interval. For each workload, the measurements can correspond to utilization of different types of resources (e.g., CPU, network, memory, hard disk storage, etc.). For each workload, the measurements can correspond to resource utilization at different times or time intervals (e.g., times of day, days of a week, etc.).

The resource utilization data 112 can be generated by the computer 100, at least one other computer, or a combination thereof. If generated by an external source, the computer 100 can obtain the resource utilization data 112 from the external source using the support circuits 104, hardware peripheral(s) 110, or the IO interface 106, or any combination thereof (e.g., through a network interface, from a storage device, etc.).

Figure 2:
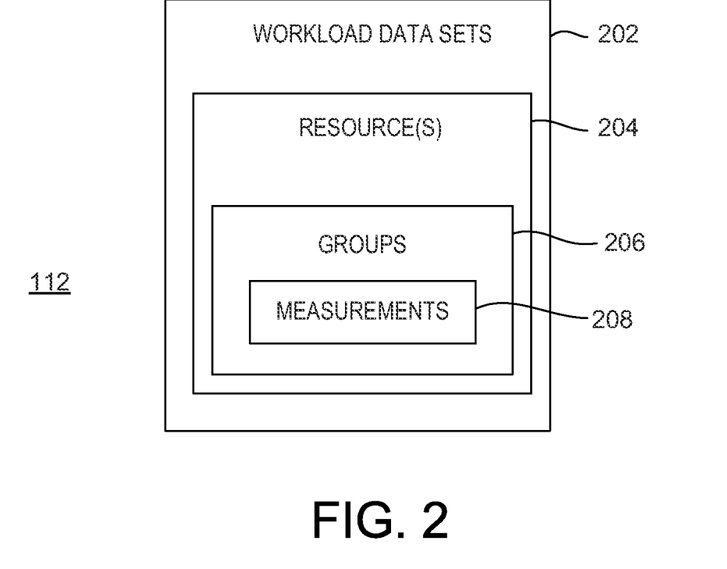
FIG. 2 is a block diagram showing resource utilization data according to an example implementation.

FIG. 2 is a block diagram showing the resource utilization data 112 according to an example implementation. The resource utilization data 112 can include a plurality of workload data sets 202. Each of the workload data sets 202 includes data for at least one computer resource ("resource(s) 204") obtained from monitoring a particular workload. For each of the resource(s) 204, each of the workload data sets 202 include groups 206 of measurements 208. Each of the groups 206 can correspond with a particular period of time ("time interval"). The measurements 208 can be made periodically or aperiodically during a time interval. In an example, each of the groups 206 can include measurements 208 corresponding to an hour. The measurements 208 can be made periodically during the hour interval, such as every five minutes.

The groups 206 and the measurements 208 can be organized in various configurations. For example, one configuration includes 168 groups, one for each hour of a week. Within each group, the configuration can include 12 measurements (a measurement every five minutes). Such a configuration would provide a week of data for a given workload. In another example configuration, each of the 168 groups includes measurements for a month such that each group includes 48 or 60 measurements (i.e., measurements for 4 or 5 weeks). That is, a group can correspond with an hour between 12 PM and 1 PM on Monday. If a month includes four Mondays, then such a group would include 48 measurements (assuming measurements every five minutes). If a month includes five Mondays, then such a group would include 60 measurements (assuming measurements every five minutes). Another example configuration includes 24 groups, one for each hour of the day, with measurements obtained over a week or a month. Another example configuration includes 84 groups, one for each two hour interval in a day, with measurements obtained over a week or a month. Another example configuration includes two groups, one representing the 45 hours from 8 AM to 5 PM on weekdays, and another representing nights and weekends. Another example configuration includes 48 groups, 24 hourly groups for weekends, and 24 hourly groups for weekdays. In general, the groups 206 and the measurements 208 can be organized into many different configurations based on different time intervals, such as hours, days, weeks, and months.

Returning to FIG. 1, the processor 102 can implement a capacity planner 120 to provide the functions described below through execution of machine readable code. The capacity planner 120 includes a modeler 122. The memory 108 can store software 114, which includes machine readable code that is executed by the processor 102 to implement the capacity planner 120 and the modeler 122. The processor 102 can cooperate with the support circuits 104, the IO interface 106, or the memory 108, the hardware peripheral(s) 110, or any combination thereof to implement the capacity planner 120 and the modeler 122.

The modeler 122 accesses the resource utilization data 112 for parametric input. In an example, the resource utilization data 112 includes a plurality of workload data sets for a respective plurality of workloads, as illustrated in FIG. 2. The modeler 122 processes resource utilization measurements in the workload data sets to generate parameters that are descriptors of distributions of the resource utilization measurements (also referred to as "distribution parameters"). A "distribution" is a probability distribution for a particular group of resource utilization measurements.

The modeler 122 can use various types of distributions to model the resource utilization data 112. In an example, the distribution parameters that can be used to represent distributions include a location parameter, a scale parameter, and/or a shape parameter. A location parameter generally describes the location or "shift" of the distribution. An example location parameter includes a mean or a median. A scale parameter generally describes the spread of the distribution. An example scale parameter includes a standard deviation or particular percentile of the data, such as the 90th percentile. A shape parameter generally affects the shape of the distribution, rather than simply a shift of the distribution (location parameter) or the stretching/shrinking of the distribution (scale parameter). Shape parameters are used in various distributions, such as the Gamma distribution, the Weibull distribution, the Student's T-distribution, and the like.

In an example, the modeler 122 uses a normal distribution to model the resource utilization data 112. For a normal distribution, the distribution parameters can include location and scale parameters, such as means and standard deviations. In another example, for a normal distribution, the distribution parameters can include means and a specific percentile, such as the 90th percentile for the resource utilization measurements. The modeler 122 can use other types of distributions having any combination of location, scale, and shape parameters, such as square root normal, log normal, Chi squared, Gamma, Weibull, Student T, or like type distributions.

In general, a distribution represents a probability density of a group of measurements between two endpoint measurements. For example, if a group of measurements relate to CPU utilization that can range between a minimum of zero cores and a maximum of 16 cores, then a distribution of the group represents the probability density of the measurements between zero and 16 cores. The distribution can be described using a plurality of parameters, such as location, scale and/or shape parameters.

In an example, the distribution parameters for a given workload data set can be scaled. Scaling can be used to normalize the distribution parameters across workload data sets, each of which may have been obtained using different computer resources. Note that this scaling process is not related to "scale parameters" in the set of distribution parameters. This scaling process refers to normalizing the measurements, whereas the scale parameter refers to the spread of a distribution for a set of measurements. For example, some computer resources may be faster than other computer resources. In order to obtain a more meaningful comparison between workloads hosted by different sets of computer resources, the resource utilization data associated with the workloads can be normalized. The mechanism for scaling depends on the type of distribution. In an example, if the normal distribution is used, the normalization can be achieved by scaling the distribution parameters of at least one of the workload data sets. In another example, if the log-normal distribution is used, the data is scaled by adding the log of the scale factor to the mean. It is to be understood that other types of scaling can be performed based on the particular distribution being used to model the data.

In an example, the modeler 122 determines parameters representing a distribution of resource utilization measurements for each of the groups of measurements to generate a baseline of distributions across the corresponding time intervals. A baseline of distributions is generated for each of the workloads. A "baseline" is a set of distributions over time. For example, if a workload data set includes 168 groups of measurements corresponding to 168 time intervals (e.g., hours of a week), then a baseline can include a distribution for each of 168 groups and thus provide a set of distributions for 168 time intervals. A baseline calculated for a single workload data set is referred to as an "individual baseline" or a "per-workload baseline." Thus, the modeler 122 generates parameters representing per-workload baselines of distributions across time intervals for the plurality of workloads represented in the resource utilization data 112.

The modeler 122 then processes the distribution parameters to generate a combined baseline of distributions for a combination of the workloads using the per-workload baselines of distributions. A "combined baseline" is a baseline that represents all of the workloads as a combination. The modeler 122 can determine the combined baseline by summing the per-workload baselines. The combined baseline can be represented by a plurality of distribution parameters for each time interval, similar to the per-workload baselines described above.

Techniques for summing distributions depend on the particular type of distribution. For a normal distribution, for example, a mean of the sum of two normal distributions is the sum of the individual means, and the square of the standard deviation of the sum (i.e., the variance of the sum) is the sum of the squares of the individual standard deviations (i.e., individual variances). The sum of normal distributions is associative, thus the sum of N normal distributions (N>1) can be determined using an accumulation of sums.

In another example, the sum of distributions can be computed numerically. This can be useful for those distributions where an algebraic sum has no closed form (e.g., a Gamma distribution). The modeler 122 can generate values that match the particular distribution, either equally spaced in probability or random. The values can be generated for each of the distributions to be combined. The generated values for each distribution can be summed randomly, or in every possible combination. Then, the modeler 122 can compute distribution parameters that best match the resulting set of sums. Specific distribution functions will have other mechanisms to compute an approximation of the sum of two or more distributions.

Figure 3:
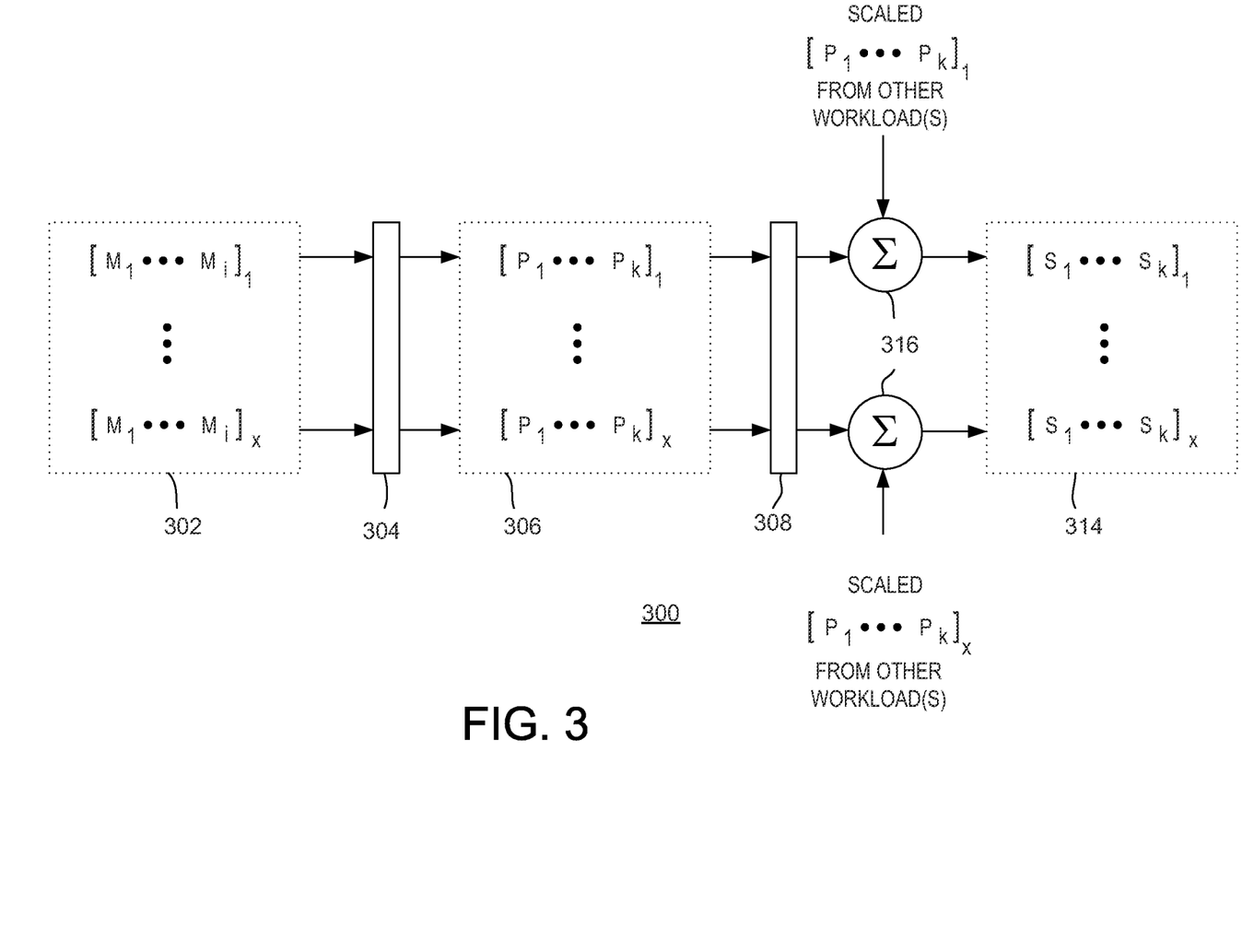
FIG. 3 shows a logical method of determining a combined baseline of distributions for a combination of workloads according to an example implementation.

FIG. 3 shows a logical method 300 of determining a combined baseline of distributions for a combination of workloads according to an example implementation. A workload data set 302 includes measurement groups one through x, where x is an integer greater than one. For example, if data is collected based on hours in a week, then x can be 168. Each of the groups includes measurements (M) one through i, where i is an integer greater than one. For example, if data is collected every 5 minutes for four weeks, then i can be 48.

The measurements in each of the groups of the workload data set 302 are processed by functions 304 to produce parameter set 306. For example, the measurements in each group can be processed using an expected value function and a standard deviation function to determine a mean and a standard deviation, respectively, for each of the groups. Thus, parameter groups one through x are determined. Each of the parameter groups includes parameters (P) one through k, where k is an integer greater than one. Parameters in the parameter set 306 can be related by a distribution function to produce distributions, which form a per-workload baseline. Each of the groups in the workload data set 302 includes measurements obtained over a time interval, and thus the per-workload baseline includes a set of distributions over several time intervals.

In some examples, the parameter set 306 can be processed by a scaling function 308. For example, workload data sets can be obtained from workloads hosted by different sets of computer resources. Some workloads can be hosted on faster computer resources, while other workloads can be hosted on slower resources. The parameter set 306 can be scaled in order to normalize the measurements of the workload data set 302. For example, if the parameters include means and standard deviations for representing normal distributions, then the means and standard deviations can be multiplied by a scale factor for normalization. In cases where no scaling is required, the scaling function 308 can be omitted.

Each per-workload distribution is then summed with respective per-workload distribution(s) from other workload data set(s) by a function 316. The scaled parameter group $[P_1 \ldots P_k]_1$ in the parameter set 306 is summed with scaled parameter group(s) $[P_1 \ldots P_k]_1$ from other workloads, the scaled parameter group $[P_1 \ldots P_k]_2$ in the parameter set 306 is summed with scaled parameter group(s) $[P_1 \ldots P_k]_2$ from other workloads, and so on until summing the scaled $[P_1 \ldots P_k]_x$ in the parameter set 306 with scaled parameter group(s) $[P_1 \ldots P_k]_x$ from other workload(s). The summation produces a combined parameter set 314 having parameter groups one through x, each having combined parameters (S) one through k. The combined parameter set 314 forms a combined baseline for a combination of the workloads.

The workload data set 302 can include many thousands of measurements. Considering data sets for other workloads, the total measurements can number in the tens of thousands or more. The workload data set 302 can be represented by a much smaller set of values in the parameter set 306. For example, if the workload data set 302 is representing by mean and standard deviation parameters for a normal distribution, then the parameter set 302 can include a few hundred values. Thus, the complexity is reduced from tens of thousands or more measurements to hundreds of parameters, which results in a significant savings in terms of the computational resources needed to model and capacity plan.

Returning to FIG. 1 the modeler 122 processes the resource utilization data 112 as described above and produces the model data 118. The model data 118 can include a combined baseline of distributions for a combination of the workloads represented by the resource utilization data 112. The capacity planner 120 can process the model data 118 to generate metric(s) for the combination of workloads.

For example, the capacity planner 120 can process the model data 118 to determine an estimate of peak resource utilization by the combination of the workloads in at least one time interval (e.g., an instantaneous metric). The capacity planner 120 can determine an estimate of resource utilization expected to be exceeded by the combination of workloads a defined percentage of time (e.g., what resource utilization the workloads are expected to exceed 1% of the time). The capacity planner 120 can generate various metrics using the model data 118 that relate the combination of workloads with computer resources. The capacity planner 120 generates capacity plan data 116 as output.

The capacity plan data 116 can be used to determine an amount of computer resources needed to host the plurality of workloads such that bottlenecks occur only some percentage of time. Conversely, the capacity plan data 116 can be used to determine the percentage of time bottle necks will occur if the plurality of workloads is hosted with a particular amount of computer resources. The computer resources can be part of at least one computer. Hence, the capacity plan data 116 can be used to relate computer(s) and associated resources with the plurality of workloads.

Figure 4:
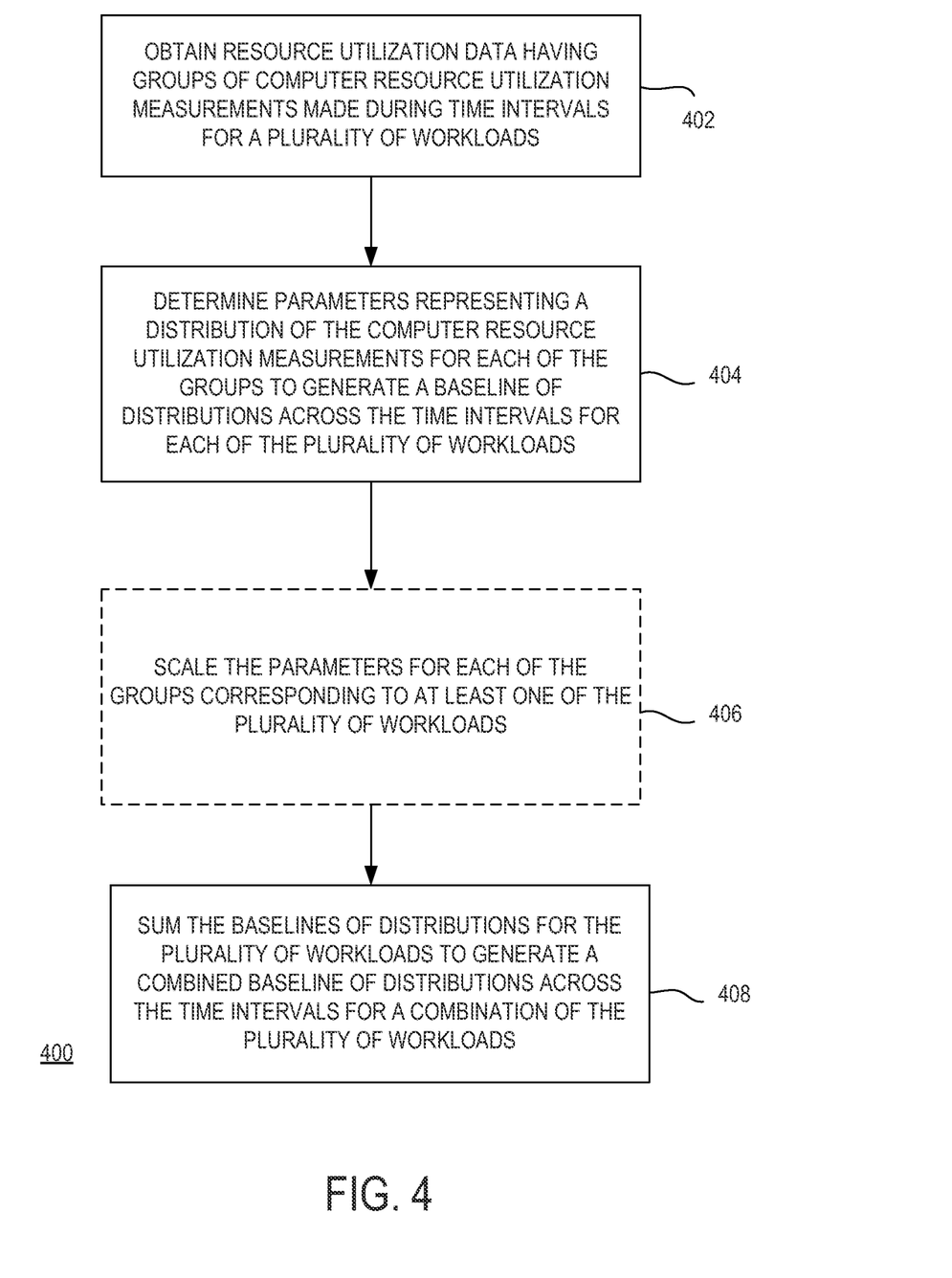
FIG. 4 is a flow diagram depicting a method of modeling computer resource utilization according to an example implementation.

FIG. 4 is a flow diagram depicting a method 400 of modeling computer resource utilization according to an example implementation. The method 400 can be performed by the modeler 122 described above. The method 400 begins at step 402, where a computer obtains resource utilization data, the resource utilization data having groups of computer resource utilization measurements made during time intervals for a plurality of workloads. At step 404, the computer determines parameters representing a distribution of the computer resource utilization measurements for each of the groups to generate a baseline of distributions across the time intervals for each of the plurality of workloads. At optional step 406, the computer scales the parameters for each of the groups corresponding to at least one of the workloads. At step 408, the computer sums the baselines of distributions for the workloads to generate a combined baseline of distributions across the time intervals for a combination of the plurality of workloads.

Figure 5:
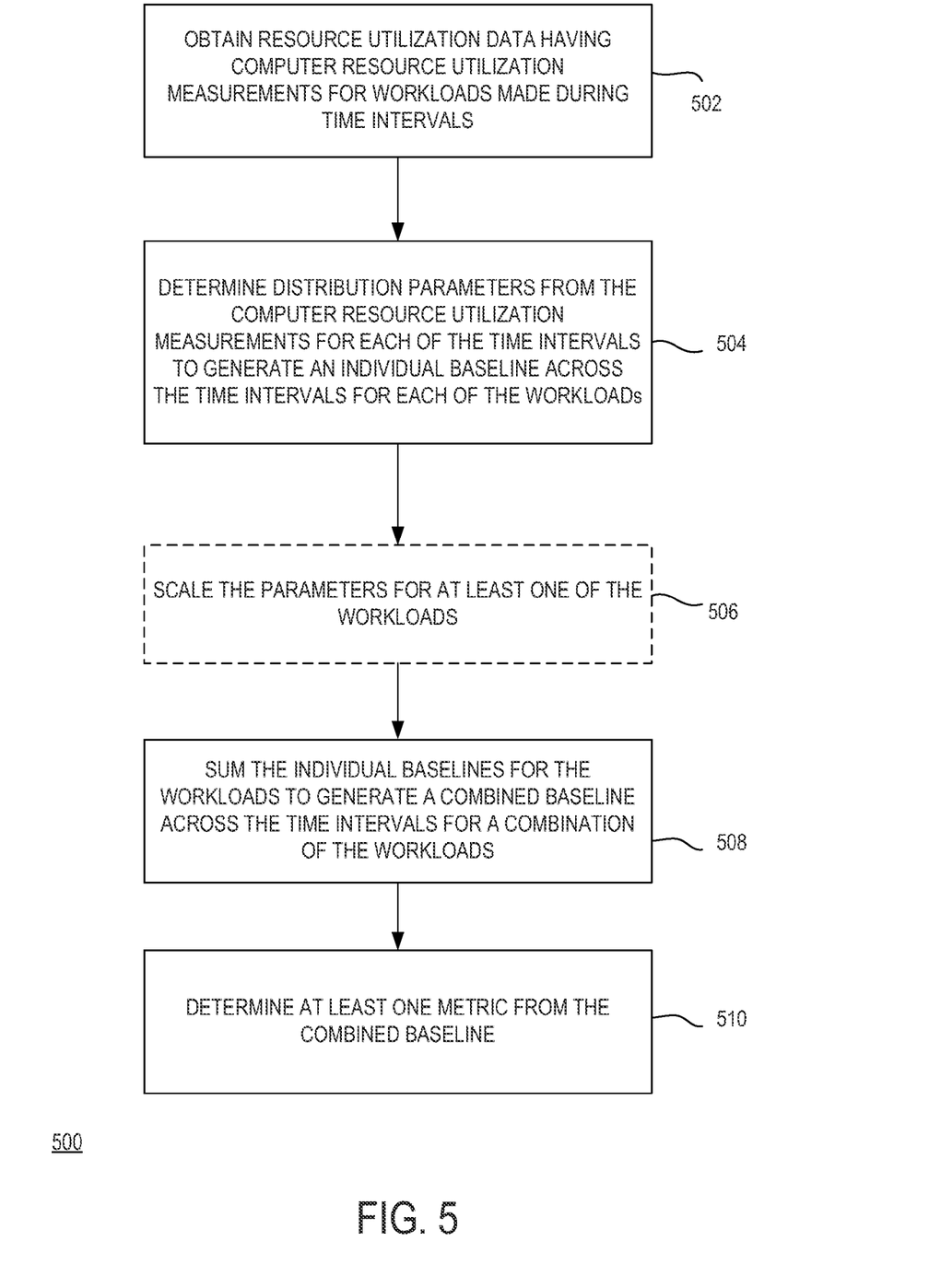
FIG. 5 is a flow diagram depicting a method of capacity planning for plurality of workloads according to an example implementation.

FIG. 5 is a flow diagram depicting a method 500 of capacity planning for plurality of workloads according to an example implementation. The method 500 can be performed by the capacity planner 120 described above. The method 500 begins at step 502, where a computer obtains resource utilization data having computer resource utilization measurements for a plurality of workloads made over a plurality of time intervals. The resource utilization data can be in any configuration, including any of the example configurations described above (e.g., the example configuration of FIG. 2).

At step 504, the computer determines distribution parameters from the computer resource utilization measurements for each of the plurality of time intervals to generate an individual baseline across the plurality of time intervals for each of the plurality of workloads. Depending on the configuration of the resource utilization data, there a number of resource utilization measurements made during each of the time intervals for each of the workloads. Distribution parameters can be determined for each of these groups of measurements effectively providing a distribution of the measurements for the given time interval for the given workload. The collection of distributions over the time intervals provides an individual baseline for a given workload.

At optional step 506, the computer scales the distribution parameters for at least one of the workloads. Scaling can be performed to normalize the distribution parameters across the workloads.

At step 508, the computer sums the individual baselines for the plurality of workloads to generate a combined baseline across the plurality of time intervals for a combination of the workloads. In an example, for a given time interval, the distributions determined for each of the workloads are summed or otherwise combined to form a combined distribution. The collection of combined distributions for all of the time intervals provides a combined baseline for a combination of the workloads. At step 510, the computer determines at least one metric from the combined baseline. The metrics can describe various relations between the workloads and computer resources proposed to host the workloads.

Computer resource utilization modeling for multiple workloads is described. Distributions are used to model computer resource utilization of multiple workloads, which can be used for purposes of capacity planning. Peak and average resource utilization for individual workloads can be obtained and averaged to estimate peak load for a combination of workloads. However, such a measure can be inaccurate, leading to unforeseen bottlenecks when the workloads are combined. A baseline of averages can be determined for each of the workloads over time, and the baselines can be summed to produce an estimated baseline for the combination of workloads. However, data within the time intervals is lost by the averaging and thus an instantaneous peak load of the combined workloads cannot be estimated. In examples above, an individual baseline of distributions is determined for each of the workloads. The combined baseline of distributions is formed from the individual baselines for a combination of the workloads. The combined baseline of distributions can be used to yield both average and instantaneous metrics, providing for more accurate capacity planning than using only averages or baselines of averages.

The techniques described above may be embodied in a computer-readable medium for configuring a computing system to execute the method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc., just to name a few. Other new and various types of computer-readable media may be used to store machine readable code discussed herein.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method, comprising:
    making, via a computer, utilization measurements of at least one computer resource during time intervals for a plurality of workloads;
    grouping, via the computer, the computer resource utilization measurements into groups;
    determining, via the computer, parameters representing a probability distribution of the computer resource utilization measurements for each of the groups;
    generating, via the computer, from the determined parameters; a baseline as a set of the probability distributions across the time intervals for each of the plurality of workloads; and
    generating, via the computer, a combination of the baselines as a combined baseline of probability distributions across the time intervals for a combination of the plurality of workloads.

2. The method of claim 1, wherein the determined parameters for each of the groups include at least one of a location parameter, a scale parameter, or a shape parameter.

3. The method of claim 1, wherein generating the combination of the baselines includes summing the combination of the baselines.

4. The method of claim 1, wherein the determined parameters for each of the groups include a mean and one selected from a group comprising a percentile and a standard deviation.

5. The method of claim 1, further comprising:
scaling the determined parameters for the groups corresponding to at least one of the plurality of workloads.

6. An apparatus to model computer resource utilization, comprising:
a memory to store computer resource utilization data, the computer resource utilization data having a plurality of workload data sets for a respective plurality of workloads, each of the plurality of workload data sets including computer resource utilization measurements made across a plurality of time intervals; and
a processor to access the computer resource utilization data in the memory, to process the computer resource utilization measurements in the plurality of workload data sets to generate parameters representing per-workload baselines of probability distributions across the plurality of time intervals for the plurality of workload data sets, and to process the parameters to generate a combined baseline of probability distributions for a combination of the plurality of workloads from the per-workload baselines of probability distributions.

7. The apparatus of claim 6, wherein the parameters include at least one of a location parameter, a scale parameter, or a shape parameter for the computer resource utilization measurements for each of the plurality of time intervals for each of the plurality of workload data sets.

8. The apparatus of claim 6, wherein the processor scales the parameters for at least one of the workload data sets.

9. The apparatus of claim 6, wherein the processor processes the combined baseline of probability distributions for the combination of the plurality of workloads to generate at least one metric.

10. The apparatus of claim 9, wherein the at least one metric includes an estimate of a mean computer resource utilization by the combination of the plurality of workloads.

11. The apparatus of claim 9, wherein the at least one metric includes an estimate of peak computer resource utilization by the combination of the plurality of workloads in at least one of the plurality of time intervals.

12. The apparatus of claim 9, wherein the at least one metric includes an estimate of computer resource utilization expected to be exceeded by the combination of the plurality of workloads a defined percentage of time within the plurality of time intervals.

13. A method, comprising:
obtaining, via a computer resource, utilization data of the computer resource for a plurality of workloads over a plurality of time intervals;
determining, via the computer resource, probability distribution parameters from the computer resource utilization data for each of the plurality of time intervals;
generating, via the computer resource, an individual baseline across the plurality of time intervals for each of the plurality of workloads from the probability distribution parameters;
summing, via the computer resource, the individual baselines for the plurality of workloads into a combined baseline across the plurality of time intervals for a combination of the plurality of workloads; and
determining, via the computer resource, at least one metric from the combined baseline.

14. The method of claim 13, wherein the probability distribution parameters include at least one of location parameters, scale parameters, and shape parameters.

15. The method of claim 13, wherein the probability distribution parameters for each of the groups include a mean and a percentile.

16. The method of claim 13, wherein the probability distribution parameters for each of the groups include a mean and a standard deviation.

17. The method of claim 13, further comprising: scaling, via the computer resource, the probability distribution parameters for at least one of the plurality of workloads.

18. The method of claim 13, wherein the at least one metric includes an estimate of a mean computer resource utilization by the combination of the plurality of workloads.

19. The method of claim 13, wherein the at least one metric includes an estimate of peak computer resource utilization by the combination of the plurality of workloads in at least one of the plurality of time intervals.

20. The method of claim 13, wherein the at least one metric includes an estimate of computer resource utilization expected to be exceeded by the combination of the plurality of workloads a defined percentage of time within the plurality of time intervals.

* * * * *

UNITED STATES PATENT AND TRADEMARK OFFICE
CERTIFICATE OF CORRECTION

| | |
|---|---|
| PATENT NO. | : 8,578,023 B2 |
| APPLICATION NO. | : 13/194505 |
| DATED | : November 5, 2013 |
| INVENTOR(S) | : Wade J Satterfield et al. |

It is certified that error appears in the above-identified patent and that said Letters Patent is hereby corrected as shown below:

In the Claims

In column 8, line 57-58, in Claim 1, delete "parameters;" and insert -- parameters --, therefor.

Signed and Sealed this
Eighteenth Day of February, 2014

Michelle K. Lee
*Deputy Director of the United States Patent and Trademark Office*